Aug. 17, 1965 W. LEE ETAL 3,201,113
DOCUMENT FEED APPARATUS
Filed Oct. 21, 1963 7 Sheets-Sheet 1

INVENTORS
WALTER LEE,
JACK S. HOOVER & CORNELL S. MARSCHALKO
BY
Mason, Fenwick & Lawrence
ATTORNEYS

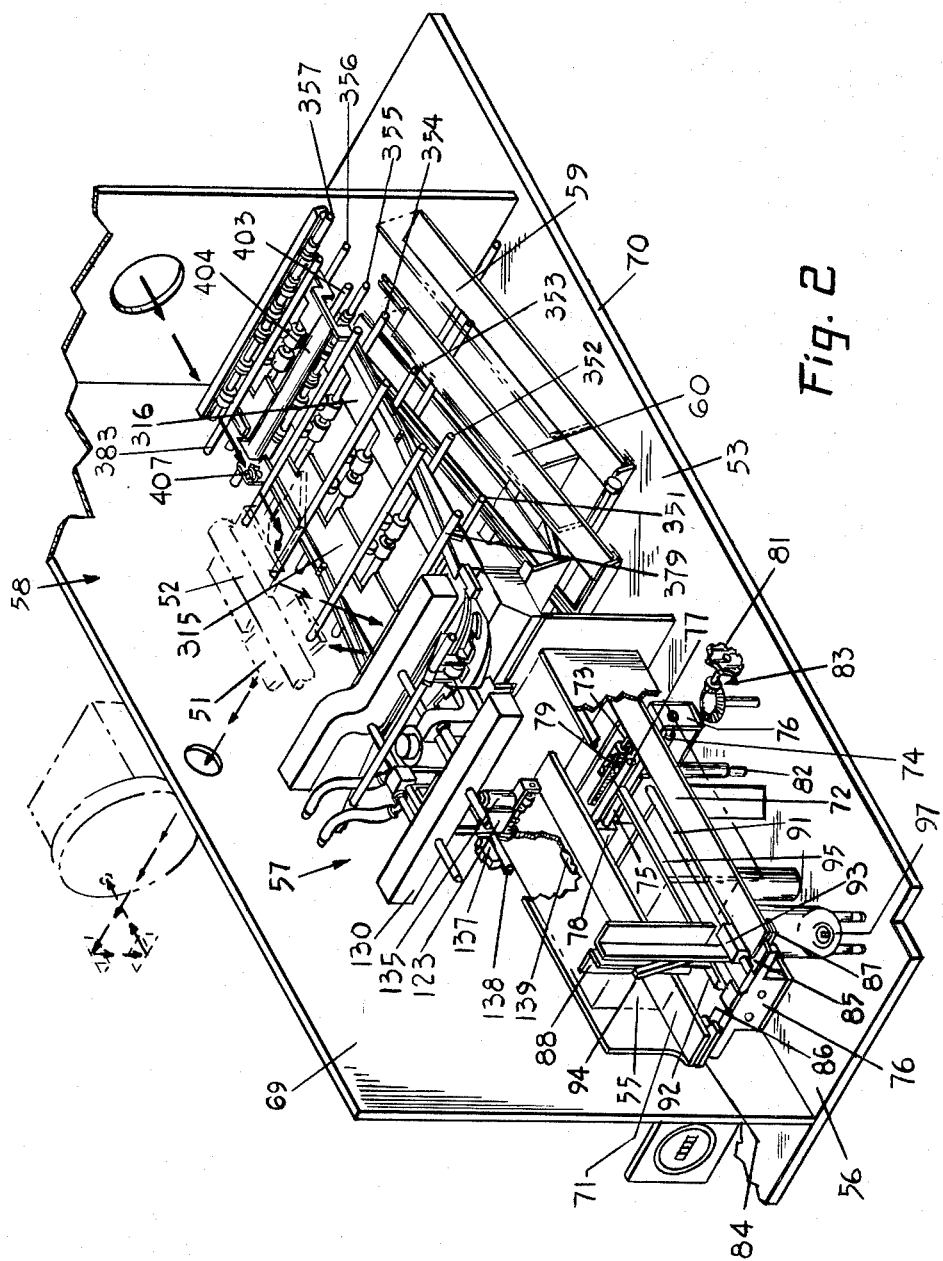

Aug. 17, 1965

W. LEE ETAL 3,201,113

DOCUMENT FEED APPARATUS

Filed Oct. 21, 1963

INVENTORS
WALTER LEE, JACK S. HOOVER & CORNELL S. MARSCHALKO
BY
Mason, Fenwick & Lawrence
ATTORNEY Aug. 17, 1965  W. LEE ETAL  3,201,113
DOCUMENT FEED APPARATUS
Filed Oct. 21, 1963  7 Sheets-Sheet 4

INVENTORS
WALTER LEE, JACK S. HOOVER & CORNELL S. MARSCHALKO
BY
Mason, Fenwick & Lawrence
ATTORNEY Aug. 17, 1965
W. LEE ETAL
3,201,113
DOCUMENT FEED APPARATUS
Filed Oct. 21, 1963
7 Sheets-Sheet 5
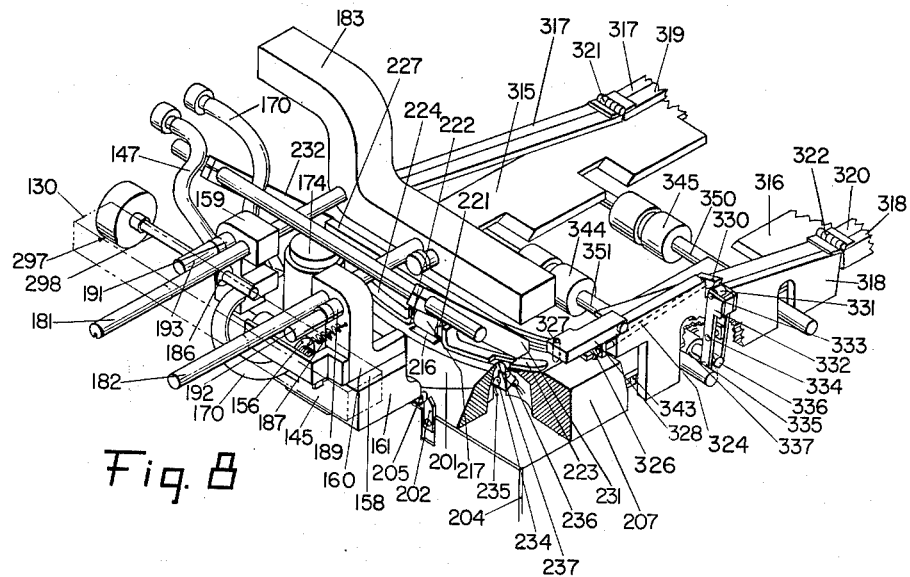
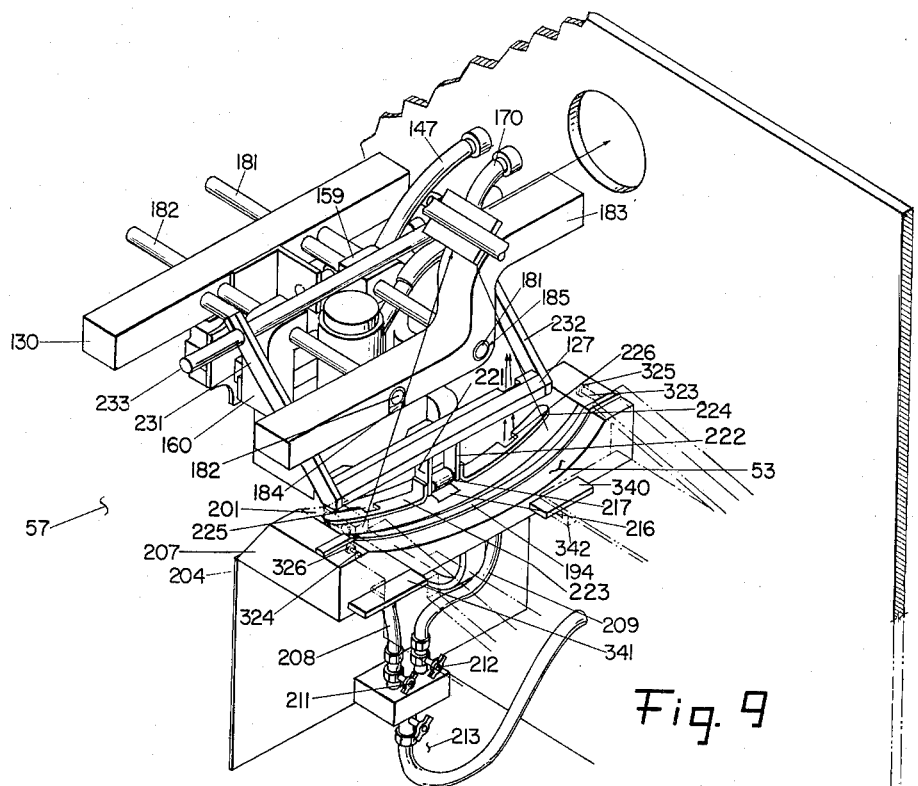
INVENTOR.
WALTER LEE, JACK S. HOOVER & CORNELL S. MARSCHALKO
BY
Mason, Fenwick & Lawrence
ATTORNEY

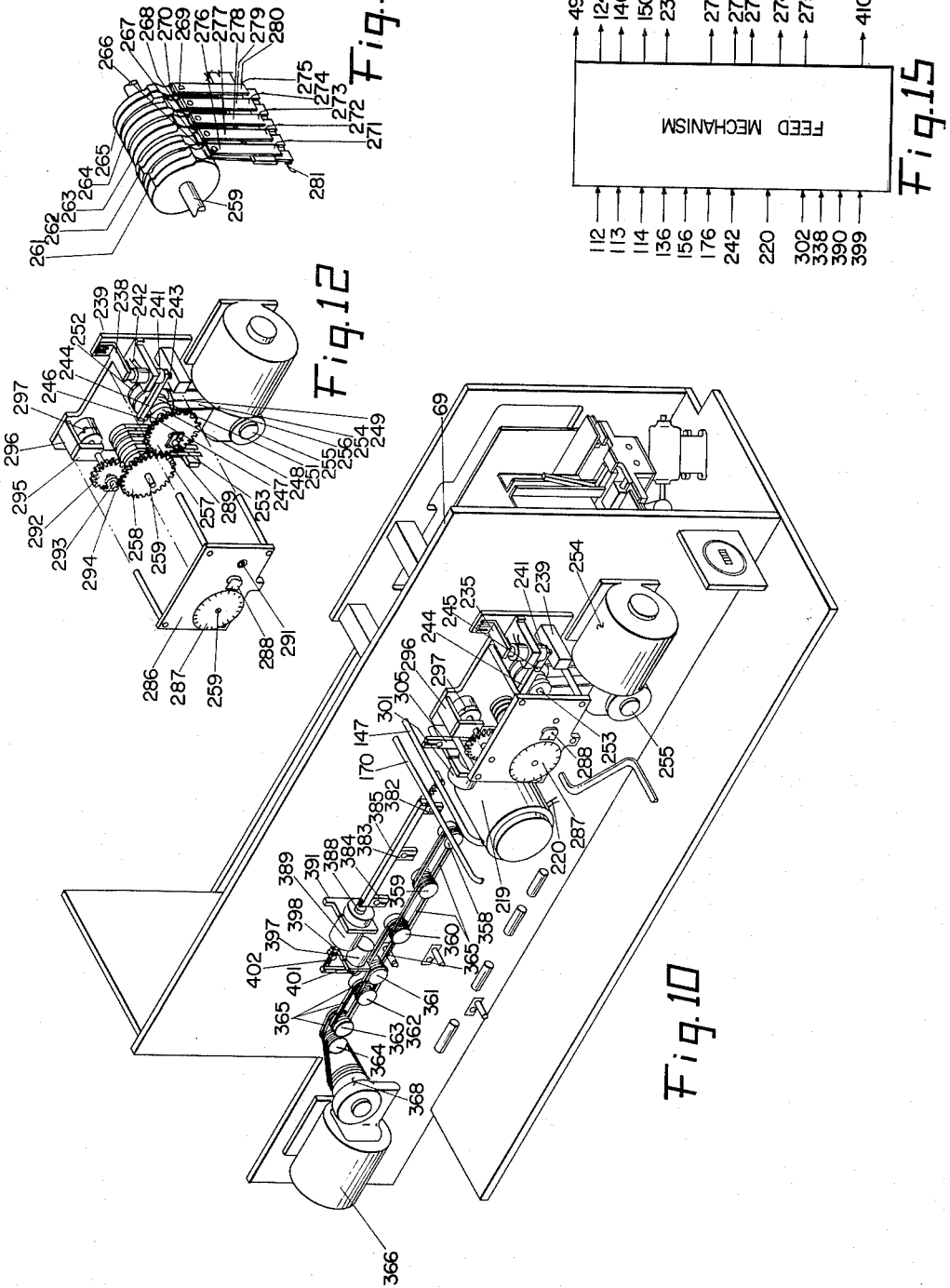

United States Patent Office 3,201,113
Patented Aug. 17, 1965

3,201,113
DOCUMENT FEED APPARATUS
Walter Lee, Springfield, Jack Sherwood Hoover, Arlington County, and Cornell Stephen Marschalko, Alexandria, Va., assignors to Farrington Electronics Inc., Alexandria, Va., a corporation of Massachusetts
Filed Oct. 21, 1963, Ser. No. 317,755
17 Claims. (Cl. 271—5)

The present invention relates in general to apparatus for feeding documents along a document feed path, and more particularly to document feeding apparatus for use with automatic character sensing machines. This application is an improvement over application Serial No. 208,432 filed July 9, 1962 by Howard W. Silsby III et al. and owned by the assignee of this application.

Briefly the present invention relates to improvements in apparatus for handling documents along a selected document advancement path and regulating the position of the documents, and more particularly to a variable length and width document feed apparatus for use with high speed character sensing equipment for advancing documents one at a time through the reading station in the scanning subassembly of such equipment and automatically controlling the positioning thereof with respect to the reading station by prior selective programming, so as to achieve a versatile automatic charatcer reading system.

The present invention, while being subject to numerous applications which will be apparent to persons skilled in the document handling art is particularly applicable to the field of automatic character sensing, and the ensuing description will be directed to the use of the present invention in connection with automatic character sensing equipment. The description of the manner of the instant invention in the field of automatic character sensing will be adequate to enable persons skilled in the art to understand the manner of its use in other applications.

In the field of character sensing, including optical scanning, magnetic sensing and the like, recognition apparatus is used for scanning items of information such as alphabetic letters, numerals, etc., on intelligence bearing items being fed through the reading station of a scanning subassembly and converting the intelligence thereon to machine language for use with other apparatus.

Those concerned with the development of character sensing have long recognized the need for a versatile and selectively controlled automatic high speed document handling apparatus which enables character sensing apparatus to automatically operate in accordance with preselected programs upon any number of selected areas on any one document, and which is easily adaptable to varied document widths and lengths. The present invention fulfills this need.

The general purpose of the invention is to provide a selectively controlled automatic high speed document handling apparatus which may readily be adapted to accommodate documents of varied widths, lengths and weights of paper, and which may be programmed so as to control the feed apparatus to enable the character sensing mechanism to operate upon only certain preselected areas on any one document. To attain this, the invention makes use of a unique document vacuum pickup, selectively advancing one document at a time to a reading station of a scanning subassembly, then selectively stepping the document varied incremental lengths by use of programmable electronic control logic to perform a programmed document reading operation.

An object of the present invention is the provision of novel apparatus for efficiently handling page type documents one at a time.

Another object of the present invention is the provision of novel selectively programmed apparatus for efficiently advancing page type documents being sensed by character recognition equipment.

Still another object of the instant invention is the provision of means for preventing erroneous feed of a document and for separation of documents so that only one document will be fed at any one time.

Another object of the present invention is the provision of a feed system for use in character recognition apparatus which is readily adaptable for documents of varied lengths, widths and weights.

Yet another object of the present invention is to provide for accurate positioning or control of selected intelligence bearing areas on the document with respect to the scanning station.

Another object of the instant invention is the provision of monitoring devices for stopping document feed apparatus when feed or transport errors occur.

With these and other objects in view, as will hereinafter more fully appear, reference is now made to the following description taken in connection with the accompanying drawings in which:

FIGURE 2 is an isometric view of the document pickup and transport mechanism;

FIGURES 8 and 9 are fragmentary isometric views to enlarged scale of portions of the documents transport mechanism in the reading station zone of the apparatus, with parts broken away; viewed from positions near the input hopper end and the output stacker end of the apparatus, respectively;

FIGURE 10 is an isometric view of the components positioned to the rear of the main frame;

FIGURE 12 is an enlarged isometric view of the feed regualting cam bank and clutch mechanism subassembly shown in FIGURE 10, with the cover plate exploded rearwardly;

FIGURE 13 is an enlarged isometric view of the bank of feed regulating cams;

FIGURE 15 is a block diagram illustrating the electrical signals fed to and derived from the feed mechanism.

Introduction

Figure 1:
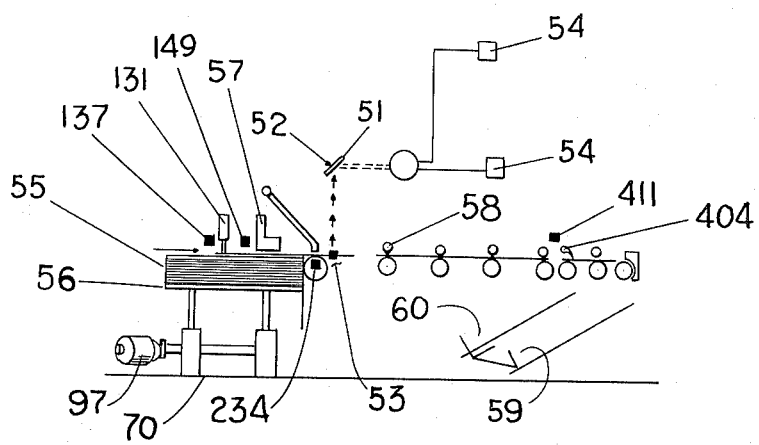
FIGURE 1 is a diagrammatic front elevation view of the document pickup and transport mechanism of the present invention in association with certain components of associated automatic character sensing equipment.

The apparatus of the present invention is designed to effect reliable and rapid, yet controllable, transport of documents, such as single pages of paper of approximately letter size, through the reading station of the scanning subassembly of automatic character sensing equipment designed to read the characters on a document in character-by-character fashion only along a preselected line or lines of characters on the document. To this end, scanning of the characters at the reading station progresses along a predetermined transverse or lateral scanning trace extending horizontally or in parallelism with the lines of characters from one end of the line to that point which denotes the end of the intelligence to be scanned on that particular line, to expose to suitable detecting means the image of one character after another along each line of characters being read.

In reading machines of the type disclosed in Shepard U.S. Patent No. 2,897,481, logical electrical circuits operating on the scanner output signals detect in these signals pulse patterns representative of selective character shapes. From the combination of shapes detected, the logical circuits either identify each character scanned or, in the case of a poorly formed character, signal that the character is unrecognizable. In the preferred embodiments the reading machine is provided with such previously disclosed logical circuitry, effecting upon a completion of a horizontal sweep, one of two pulses, either an accept pulse or a non-recognition pulse. The accept pulse denotes that the information on the document has been recognized, signifying that the line area of the document may be stepped out of the scanning station area, and the nonrecognition pulse indicates that a character or characters on the line area of the document being scanned has not been recognized by the logic circuitry, in which case that line area of the document may not be stepped forward along the document feed path, but may be scanned again. Receipt of a predetermined number of nonrecognition pulses may be programmed to cause a document line area to be marked and/or stepped along the feed path, or to cause the document to be fed to the reject stacker bin.

The feed mechanism of the present invention includes means for separating one document at a time from a stack of documents in a feed tray and feeding the same through the reading station of the scanning assembly together with means for selectively stepping the movement of the document past said reading station. The document feed mechanism, includes means for sensing a document entering the reading station and includes a variable line advance means which advances the document a predetermined number of lines, relative to the reading station. The feed mechanism, in the specific embodiment hereinafter described, is used with a scanning assembly of the type disclosed in said application Serial No. 208,432 employing an oscillating scanning mirror. Since the scanning mirror oscillates about a fixed axis, a concavely curved reading station tray is provided at the reading station to impart to the document uniform curvature concentric with the mirror axis to provide a constant length optical path between the printed characters and the mirror, and a curved entrance throat to the reading station tray combined with a complementary delivery mechanism provides for transition of the documents from a flat to a concavely curved configuration.

General description

Referring to the drawings, wherein like reference characters designate corresponding parts throughout the several figures, there is shown in FIGURES 1 and 2 the document feed apparatus of the present invention in association with an automatic character sensing mechanism which includes a scanning subassembly having a sweep mirror 51 supported for oscillation about an oscillating pivot axis 52 above and paralleling the path of the document advance through the reading station indicated generally at 53, and logic circuitry generally indicated at 54 for interpreting the characters being read, and to determine line positioning, advancement and other factors necessary to the functions of the feed. Documents 55 to be read are fed from an input document tray 56 via a feed path by shuttle carrier 57, to the reading station 53, and thence to a document process mechanism generally indicated at 58, by which the documents are advanced and sorted, discharged or otherwise fed to separate bins or pockets, such as accept pocket 59 or reject pocket 60.

Document feed mechanism

The preferred embodiment discloses a feed mechanism made to handle a document ranging in size from approximately 4½ inches to 8½ inches in width and 5½ to 13½ inches in length, having a substance weight (the weight of one ream of 17 inch by 22 inch basic size paper stock sheets) in the range of 20 to 28 pounds. In general the feed mechanism may be divided into four sections consisting of the input hopper, the shuttle, the stepping motor and the output rollers and stackers.

As will be disclosed in the ensuing description, the input hopper, feed bed and both output stacker pockets are all connected by a common width adjustment mechanism to an adjustment knob so as to simplify the feed adjustment.

The input hopper

Figure 4:
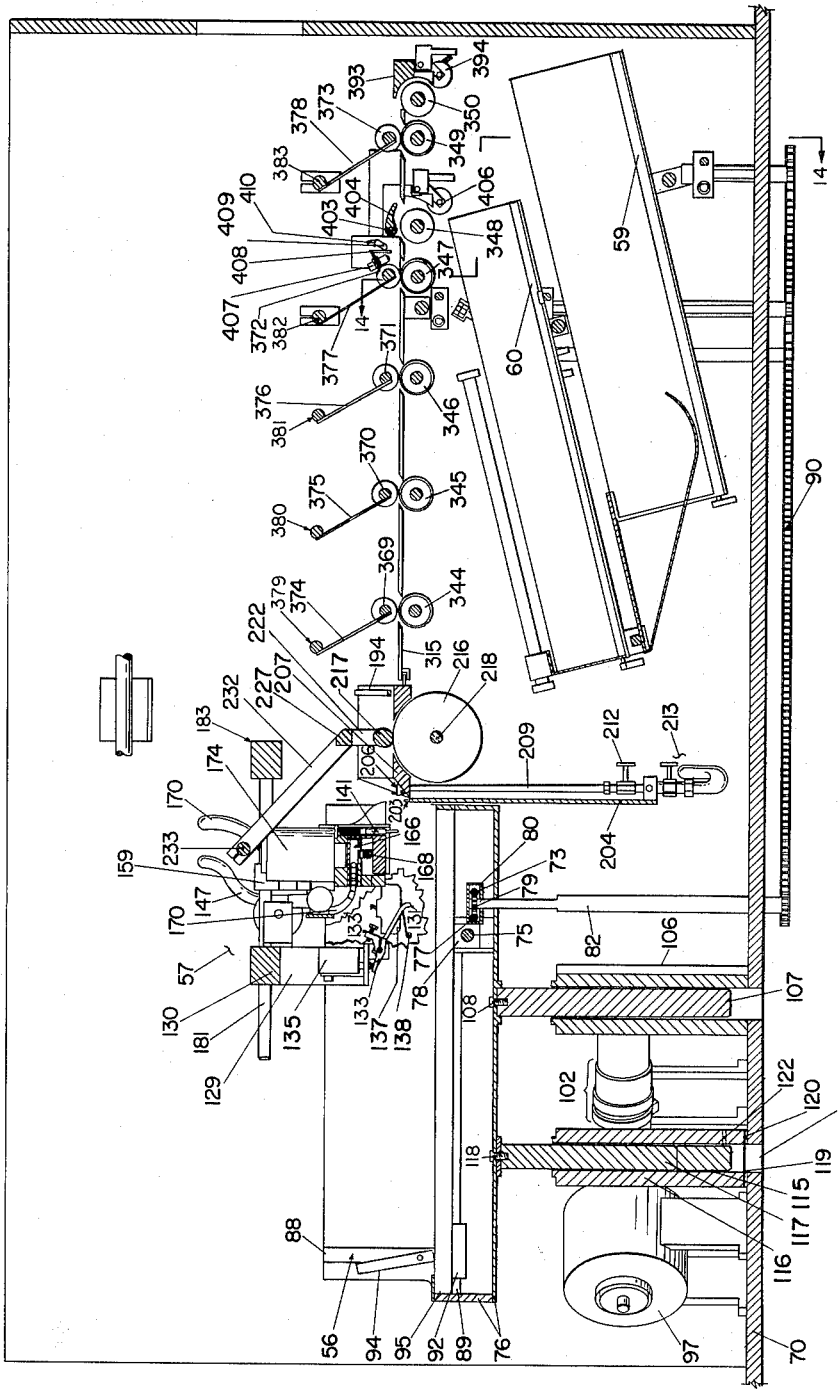
FIGURE 4 is a vertical longitudinal section view of the document pickup and transport mechanism.

There is shown in FIGURES 2 and 4 an adjustable input tray, generally designated as 56, including left and right flat support members 71 and 72 respectively, each having vertical side portions, as shown, for aligning documents 55. The support members 71 and 72 are, by manual means, conjunctively moved toward or away from each other so as to accommodate documents of different widths, said movement being accomplished by a pinion and rack mechanism. Geared rack 73 is fixedly connected to right support member 72 by way of a bored right depending member 74 which is slidable relative to rod 75, said rod 75 being mounted on the base portion 76 of the document tray member 56. Likewise geared rack 77 is fixed to left support member 71 by way of a bored left depending member 78 which is also slidable relative to rod 75. The aforesaid geared racks 73 and 77 are tangentially operatively engaged with diametrically opposite sides of pinion gear 79 within member 80, the pinion gear 79 being connected to a width adjustment knob 81 via connecting shaft assembly 82, a drive chain and sprocket assembly 90 below the main chassis 70 (see FIGURES 4 and 11) and beveled gear 83. In addition to guide rod 75 the document support members 71 and 72 are further guided laterally by guide tongues formed by the forwardly protruding edges of bars 84 and 85, mounted on the tray base member 76, interfitting in guide grooves formed by recurved depending formations 86, 87 on the members 71, 72.

Document length adjustment member 88 is slidably mounted on the spaced parallel rods 89, 91 via slide blocks 92 and 93 respectively, said adjustment member 88 being held fixed in its normal condition by a spring mounted lever 94 which frictionally engages a fixed rail 95 of the tray base member 76 when in said condition.

Figure 3:
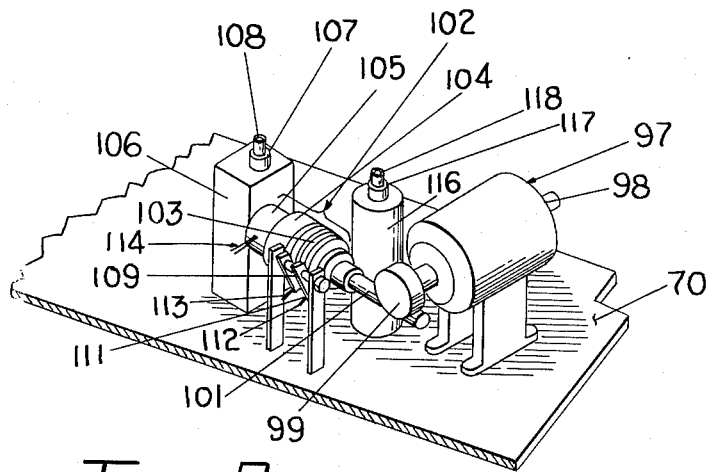
FIGURE 3 is a fragmentary isometric view of the drive motor, clutch/brake assembly and associated mechanism for automatically raising the input document tray, viewed from the opposite side as FIGURE 2.

The document tray, generally indicated as 56, is progressively raised by automatic means, so as to constantly maintain a preselected document level during the course of a feed operation. As shown in more detail in FIGURE 3, the aforesaid function is accomplished by use of a constantly driving motor 97 mounted on base chassis 70 and having a central drive shaft 98 with a drive gear 99 fixed thereon for driving the input shaft 101 of a conventional electric clutch/brake assembly 102. The clutch/brake assembly comprises a drive clutch 103, an armature 104, and a brake housing 105, the latter being fixed to the base chassis 70 via housing 106. A freely rotatable shaft (not shown) extends axially of the brake housing 105 and has one end attached to armature 104 and the other end connected to a vertically positioned rack 107 by a pinion (not shown), the rack 107 being centrally located and rotatable within housing 106 and connected to the tray base member 76 of document input tray 56 by screw means 108, (see FIGURE 4). Brushes 109 and 111 are connected to associated slip rings on the drive clutch 103, the slip rings being electrically connected to an ordinary magnetic coil within said drive clutch 103, so that when current is supplied through wire connectors 112 and 113 to brushes 111 and 109 respectively, the magnetically sensitive armature 104 will be attracted to the drive surface of drive clutch 103 to effect driving of the document input tray 56, by way of rack 107 and the associated pinion, in an upward direction until a height sensor snap action switch is actuated (to be later described). Also located within the brake housing 105 is a magnetic coil connected to wire leads 114, whereby when current is supplied to said leads, the energized coil will attract armature 104 to the fixed brake housing 105 and therefore stop the upward movement of the document tray 56 and hold the same in a stationary position until the magnetic brake coil is deenergized.

When the armature 104 is in a neutral position, that is while the armature is in contact with neither drive clutch 103 nor brake housing 105, the document input tray 56 will fall to its lowest possible position, the fall being cushioned by an air damping assembly 116 mounted on base frame 70. The damping assembly 116 comprises a slidable piston 117 within a hollow cylindrical column 115, the piston 117 being attached to the tray base member 76 of the document tray 56 by screw means 118. The air damping assembly 116 is further provided with a diaphragm 119 having a hole 120 for allowing an inflow of air, through inlet 21 in the base frame 70, into the chamber formed within the hollow column 115 by the upward moving piston 117 and bowed diaphragm 119, the diaphragm operating to effectively close off passage of air from the chamber through the inlet during the downward movement of the piston 117. Adjustable check valve 122 which is closed upon occurrence of low pressure conditions in the chamber and operates the adjusted position for high pressure conditions is employed for controlling the air outflow from the chamber during lowering of the document tray, thus damping the downward movement of the slidable piston.

Figure 5:
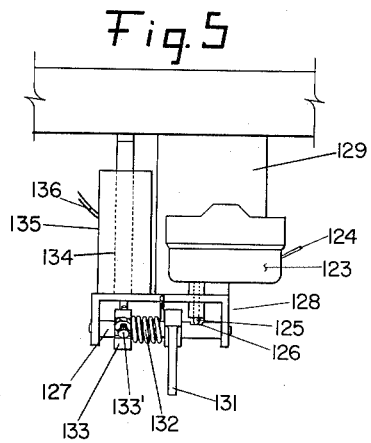
FIGURE 5 is a fragmentary vertical transverse section view of the height sensor assembly, viewed from the line 5—5 of FIGURE 4.

Above the documents 55, within the document tray 56, there is located a height sensor assembly for sensing stack document height and initiating a signal for maintaining the top document of documents 55 at the proper feed level during feeding operations. This assembly, as shown in FIGURE 5 and FIGURE 4, includes a snap action switch 123, having leads 124 and a vertically movable actuating member 125 whose lower portion rests, in one of its two possible conditions, upon the surface 126 formed by a cutaway (cam) portion of the shaft 127. The shaft 127 is mounted so as to be rotatable about its axis within frame member 128 which is rigidly attached to vertical main chassis panel 69 by post 129 and supporting cross bar 130. A document height sensor finger 131 is fixed to the center of shaft 127 and is normally biased by torsion spring 132 to force the feeler end of finger 131 downwardly. Adjacent to the sensor finger 131 is located a stub piece 133 which is also fixed to the shaft 127. Directly above the stub 133 there is a plunger 134 of solenoid 135 having leads 136, the supporting bar 130 acting as a backstop for the plunger 134 to limit the rotation of shaft stub piece 133 due to the biasing spring 132 and thereby limiting the fall distance of the sensor finger 131.

As will be later explained in more detail, finger sensor 131 is normally biased by spring 132 to be in a dropped condition, as shown in FIGURES 2 and 5. However, as the documents 55 in the input hopper tray 56, immediately after being loaded, are raised by the drive clutch 103 of the electric clutch/brake assembly 102, the top one of the documents 55 will eventually contact the height sensor finger 131 and the same will be pushed up by the documents. The lifting of the height sensor finger 131 will in turn rotate the shaft 127 to which it is attached, causing actuator 125 to be raised as it approaches the outer edge of cam surface 126 on shaft 127, thereby activating snap action switch 123 at a preselected paper height for feed purposes. The current conducted through leads 124 when switch 123 closes, is routed via logic circuitry to energize the coils within the brake housing 105, to attract armature 104 into engagement with the same and brake the upward movement of the document tray 56. Immediately thereafter, current is also supplied to solenoid 135 via leads 136 to activate the same, causing the plunger 134 to move downward against stub piece 133, which stub piece will effect further rotation of shaft 127 to lift height sensor finger 131 away from the documents during a subsequent feed operation, yet limiting a large rotation of the finger sensor 131 by an adjustable screw stop 133, as it acts against frame member 128. It is further noted that each time a sheet is fed past the reading station 53, a signal (to be later described) is generated via logic circuitry to deactivate the switch 125 and thus solenoid 135, allowing the height sensor finger 131 to drop. The aforesaid signal will last preferably for only 2 tenths of a second, unless the position of sensor finger 131 has determined that it is necessary to adjust the document tray 56, if the top of the document level is not at the proper height to be fed.

A snap action switch 137 (shown in FIGURES 2 and 4) is also provided in the document input tray area, the switch 137 having leads 140 and a spring mounted sensor finger 138. The sensor finger 138 is designed to be acted upon by the surface of a contact member 139 (FIGURE 2) forming an integral part of the document tray 56 and located between the document support members 71 and 72, the top surface of the contact member 139 being positioned at a plane which is slightly below that of the lowermost document that could be placed within the tray. Thus when the document tray 56 attains an empty condition, elevation of the document tray by the mechanism hereinbefore described brings the top surface of the contact member 139 into contact with the sensor finger 138, thereby activating snap action switch 137 to produce a signal indicating that tray 56 is devoid of documents. This, through suitable logic circuitry, momentarily energizes the coils within brake housing 105, as previously disclosed, to brake the upward movement of the tray 56. After the lapse of the momentary energizing pulse applied to the coils within brake housing 105, the armature 104 will assume a neutral position, allowing the document input tray 56 to fall by means of the air damping assembly 116 to its lowermost position as heretofore disclosed.

*The shuttle assembly*

Figure 6:
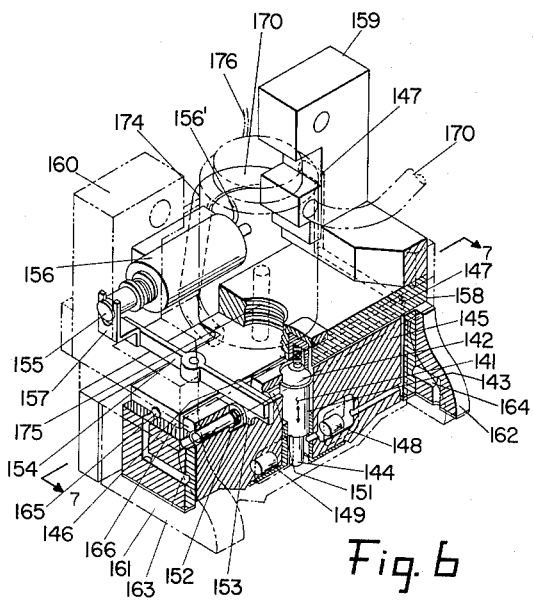
FIGURE 6 is a fragmentary isometric view with parts shown in section and parts in phantom of the shuttle subassembly.

The documents 55 are fed, one at a time, to the reading station 53 (see FIGURE 1) by means of a shuttle assembly generally indicated as 57. The shuttle assembly 57, which is disclosed in more detail in FIGURES 4 and 6, comprises a self actuating port 141 (hereinafter designated as s.a.p.), slidably mounted within the housing members 145 and 158 of the shuttle assembly. The s.a.p. 141 has top, middle and lower portions 142, 143 and 144, respectively, the lower portion 144 of the s.a.p. 141 being located directly above the document tray 56. The top portion 142 of the s.a.p. 141, normally in the condition shown in FIGURE 6, is biased downwardly by a light spring 146 mounted in the shuttle housing member 158. The s.a.p. 141 is hollow, and has openings in its top and lower portions 142 and 144, respectively, the hole in the top portion 142 being open to a tubular bore 147 in the shuttle housing, the remote or input end of which is connected to a suitable vacuum source (not shown), positioned on one side of the s.a.p. 141 is a light source 148 directly opposite to a light sensitive photocell 149 having leads 150, the photocell 149 being responsive to the light source 148 while the s.a.p. is in its up position, as shown in FIGURE 6. However, the photocell 149 is non-responsive to the light source 148 when the s.a.p. 141 is in its down (document pickup position) position as shown in FIGURE 4, due to the blocking off of said light source 148 by the larger diameter middle portion 143 of the s.a.p. 141.

When s.a.p. 141 is in its lower position, suction is applied thereto, the lower portion 144 will attract a document 55 into contact with the lower portion 144, blocking off its opening from the outside and thereby allowing the suction to suck document 55 and the s.a.p. 141 upwardly to a position spaced from the stack of documents to a document carrying position. Attainment of this document carrying position is detected by photocell 149.

The s.a.p. 141 is normally held in its upper position by a pin 151 extending under the lip of top portion 142 of the s.a.p. 141, the pin 151 being biased by lightly tensioned spring means 152 bearing against element 153 which is an integral part of pin 151. One end of a pivotal member 154 is fixed to element 153, the other end being coupled to plunger 155 of solenoid 156, having leads 156', by means of bifurcated bracket means 157 fitting in an annular groove in plunger 155. The solenoid 156 is mounted to the top piece 158 of shuttle housing 145 by post 160.

Figure 7:
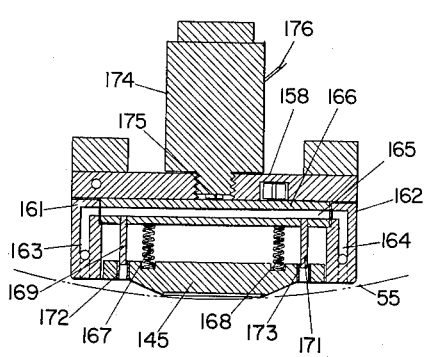
FIGURE 7 is a vertical transverse section view of the shuttle subassembly, taken along the line 7—7 of FIGURE 6.

Shuttle legs 161, 162 are located on the opposite sides of the shuttle housing 145, each of the legs having a bore opening through the lower surface facing the documents 55 in the input tray 56 and forming conduits 163 and 164 to be connected to suction means (not shown) by conduit 165 in center part 166, to which the legs 161 and 162 are integrally connected, and flexible conduit tubing 170 (see FIGURES 2 and 4). Center part 166 is positioned below housing member 158 (see FIGURE 7) and adjacent housing member 145, but separated from the same by vertically located tension springs 167 and 168, alongside which are vertical extending guide rods 169 and 171 respectively fixed to the center part 166 and extending into guide slots 172 and 173 of the housing member 145, for guiding the vertical movement of the center part 166 and the associated integral shuttle legs 161 and 162. There is further located above center part 166, solenoid 174 fixedly attached to housing member 158 and having a plunger 175 which abuts the top surface of center part 166, so that when the solenoid 174 is activated through leads 176, plunger 175 will be forced in a downward direction against the center part 166 to urge the same and the associated legs 161, 162 against the tension springs 167, 168 and guided by vertically extending guide rods 169 and 171.

It will be observed that the retraction of the shuttle legs 161, 162 and the s.a.p. 141, after having attracted a document 55 by suction through conduits 163 and 164, will transform the document shape so as to give the same a curvilinear form (see FIGURE 7) for feeding the same to the curvilinear shaped reading station 53.

The movement of the shuttle assembly 57 from over the input hopper area to the reading station 53 and back, is guided, as shown in FIGURES 8 and 9, by two parallel rods 181 and 182, each of which projects through and is secured to one of the shuttle arms 159 and 160 respectively. The respective ends of the rods 181 and 182 further project through supporting members 130 and 183 to be freely movable therein by way of bearings 184, 185 (FIGURE 9) and others not shown. Each of said supporting members 130 and 183 is attached to vertical main chassis panel 69 and support the rods 181 and 182 in a manner permitting them to conjunctively carry or shift the shuttle assembly 57 from over the input hopper area to the reading station 53 and back again. This motion of the shuttle assembly is caused by the coaction of gear drive 186 and rack teeth on rod 181 (FIGURE 8), the gear drive 186 being driven by a conventional magnetic clutch/brake assembly as will hereinafter be disclosed. The return of the shuttle assembly 57 is effected by spring member 187, fastened to shuttle arm 160 and supporting member 130, occurring only when the aforesaid magnetic clutch (later to be described in more detail) is disengaged. The stopping of the shuttle assembly 57 when moving in a paper feed direction is cushioned by the coaction of rubber tip 188 on support 183 (see FIGURE 8) and shuttle arm 160, and when moving in the return direction is cushioned by the coaction of rubber tips 189 and 191 on rods 192 and 193, respectively, projecting from the sides of supporting member 131, with the shuttle arms 160 and 159 respectively.

There is shown in FIGURES 2, 4, 8 and 9, a reading station 53 adjacent to document guide 194 to which documents 55 are fed one at a time by the shuttle assembly 57. As the document 55 is carried by the shuttle assembly 57 and approaches the curved throat surface 201, it passes before a pair of picker knives 202 and 203, located within vertical plate 204 at the entrance to the reading station, each of the knives being adjustable by a conventional screw and vertical slot means, as shown, to literally pick off any excess documents carried by the shuttle assembly. There is further encountered adjustable spouts or orifices 205 and 206, located within the curved throat member 207 and on either side of the entrance of curved throat surface 201, through which air pressure is fed by way of tubes 208 and 209, respectively, having control valves 211 and 212 for regulating the air pressure from the central tube and valve assembly 213 which receives air pressure from the exhaust of the undisclosed vacuum pump. The discharge or stream of air from spouts or orifices 205 and 206 assists to separate the excess documents picked up by the vacuum system of the shuttle assembly 57.

When the document 55 is deposited at the curved throat 201 by the shuttle assembly 57, it is positioned to have the leading edge of the document 55 overlie the stepping roller 216, a portion of the stepping roller slightly protruding through a slot in the top surface of the curved throat member 207, so that when idler roller 217 is lowered into contact with the roller 216 or paper therebetween, there will be provided sufficient contiguity between the document 55 and stepping roller 216. Stepping roller 216 is located on the output shaft 218 of the stepping motor 219, having leads 220, the motor 219 hereinafter to be described in more detail.

Idler roller 217 is rotatably mounted on a shaft connected to vertical plates 221 and 222, each of the vertical plates 221 and 222 having ear like members 223 and 224 attached thereto for guiding documents 55 within the curved throat area. Inlets 225 and 226 are provided in the ear like members to accommodate the forwardly extending portions of the shuttle leg members 161 and 162. Vertical plates 221 and 222 are joined to a lateral extending component 227 which is connected on each of its sides to limb members 231 and 232, each of which is further fixedly attached to a rod 233 pivotable around its axis to thereby rotate the idler roller 217 within a limited arc, to and away from the stepping roller 216, so as to allow the document 55 to be inserted in between the same.

Within the right hand side of the throat member 207 (as viewed in FIGURE 8) are located a photocell sensing device 234 having leads 235 and a light source 236, each of which is directed to a hole 237 in the curved throat surface 201. The sensitive photocell 234 will receive the reflected light of light source 236 only when a document is covering at least a portion of the hole 237, to thereby generate a signal or leads 235 to indicate that a document has entered the throat area, a document remains in the throat area, or a document has been forwarded from the throat area. In the latter instance the lack of a signal generally activates the feed mechanism through the single revolution clutch 249 (to be later described) to initiate another feed cycle. The hole 237 is positioned to be at a prescribed distance from the scanning station 53.

On the back side of the vertical main chassis panel 69 (see FIGURES 10, 11 and 12), is arranged a feed solenoid 241 having leads 242 and a plunger 243 abutting one end of lever arm 244 pivoted on shaft 245 and having an adjustable backstop 235 mounted on plate 236 which is affixed to the vertical main chassis panel 69. Positioned underneath the lever arm 244 and directly below the plunger 243 is an upwardly biased finger 237 (FIGURE 11) biased by means of a spring 238 within sationary block 239. The other end of the lever arm 244 has a stop portion 246 which abuts a radial projection 247 on a control cam 248 fixed on the shaft 253 of a conventional single revolution clutch mechanism 249. The clutch mechanism 249 further includes a hub 251 which is also fixed to shaft 253 and connected by roller bearings to the clutch sleeve and housing 252 centered about shaft 253, and is continuously driven at constant speed by belt 256 trained about a pulley 255 on the output shaft of motor assembly 254.

At the end of shaft 253 is a gear 257 (see FIGURES 12 and 13), meshed with a second gear 258, mounted on shaft 259, which also carries a bank of coaxial cams 261, 262, 263, 264 and 265. These cams are normally disengaged from contact with springlike, electrically conductive arms 266, 267, 268, 269 and 270, respectively, due to the irregular voids around the peripheries of the respective cams. Since each of the cams 261–265 is fixed to the shaft 259, they will all rotate in unison and the rises or lobes on the individual cams 261–265 will come into engagement with their respective contact arms 266–270 having a current source input connected thereto by lead 281 from a conventional source of electrical energy (not shown). The spring-like contact arms 266–270 engage, at different intervals determined by the positions of the cam lobes, the electrically conductive members 276–280, completing electrical circuits to perform different feed functions through leads 271–275 as will hereinafter be disclosed. There is provided on cover plate 286 a circular indicator disk 287, marked off in degrees, and a 0 degree index 288, so that one may individually adjust each of the cams 261–265 for the correct timing of electrical contact at the points 276–280 within the 360° cycle rotation furnihsed by the single revolution clutch assembly 249. There is further provided a conventional drag clutch assembly 289 about shaft 253 and fixed to cover plate 286 to insure that shaft 253 to which the cam 248 is attached returns to the 0° position of shaft 253 after the shaft rotates one cycle of 360 degrees.

Gear 258 is further meshed with gear 292 located about shaft 293 and provided with a slip clutch 294. Members 295 and 296 provide additional support for shaft 293. Below member 296 and located on shaft 293 is a conventional magnetic clutch/brake assembly 297 extending through the vertical main chassis panel 69. Shaft 293 is split so as to accommodate the magnetic clutch/brake assembly 297, the other portion of this shaft extending on the feed side of main chassis panel 69, as shown in FIGURE 8, and having drive gear 186 mounted thereon for driving the shuttle assembly 56 by means of geared rod 181.

Figure 11:
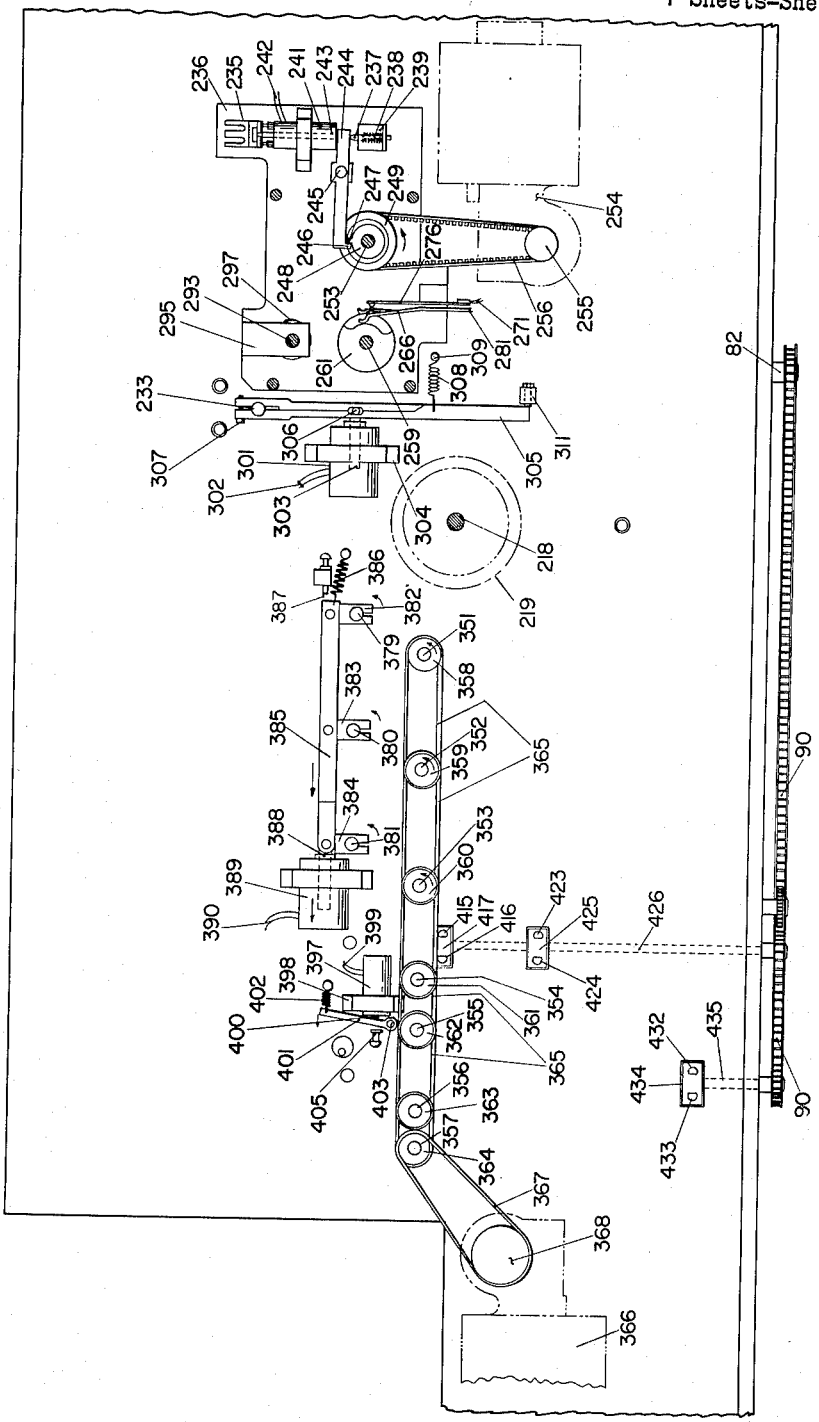
FIGURE 11 is a rear elevation view of the components shown in FIGURE 10.

There is further disclosed in FIGURES 10 and 11, the mechanism which controls the rotation of rod 233 (FIGURE 9) and thereby the movement of idler roller 217 to and from engagement with a document 55 overlying the stepping roller 216. The aforesaid mechanism comprises a solenoid 301, having leads 302 and a plunger 303, and mounted on chassis panel 69 by means of a bracket 304. Plunger 303 is pivotally attached to an arm member 305 by rod 306, the arm being split to accept rod 233 and being held in assembled relation by screw means 307. The arm member 305 is normally biased by a spring means 308 affixed to main chassis panel 69 by screw 309, and is limited in its movement by adjustable stop means 311 affixed to the panel 69.

When the feed solenoid 241 is pulsed to activate the single revolution clutch mechanism 249, the five cams 261–265 will rotate in unison to traverse a complete 360° cycle in 433 milliseconds. The cam 261 is shaped to force conductive arm 266 into engagement with contact member 276 for a period from 0° to 270°, activating an air valve solenoid allowing a vacuum from conduit tubing 170 to be present at the shuttle legs 161 and 162 until the document is deposited at the curved throat 207. Cam 262 is shaped to engage conductive arm 267 with contact member 277 for a period from 5° to 60°, activating solenoid 174 to drive down the shuttle legs 161 and 162 to pick up the right and left edges of document 55. At the termination of the solenoid activating period of cam 267, the shuttle legs 161, 162 are then spring returned to elevated position, giving the document 55 the necessary curvature to be fed and read at the reading station 53. Cam 263 is shaped to engage conductive arm 268 with contact member 278 for a period from 45° to 275°, activating solenoid 301 lifting the idler roller 217 at the curved throat 207 until the document 55 comes under the control of the stepping roller 216. Cam 264 is shaped to engage conductive arm 269 with contact member 279 for a period from 90° to 270°, activating the magnetic clutch 297 for driving the entire shuttle assembly 57 forward far enough to deposit the document 55 at the curved throat 207. Cam 265 is shaped to engage conductive arm 270 with contact member 280 for a period from 270° to 300°, activating electric brake 297 to hold the shuttle assembly 57 forward. It is at this time when the shuttle is temporarily at rest, that the vacuum is removed from the s.a.p. 141 and from the shuttle legs 161 and 162, allowing the document to be deposited at the curved throat 207. Once the electric brake 197 is deactivated, the shuttle assembly 57 is returned to its original position by spring 57.

*Stepping motor*

The stepping motor unit 219 is used to advance document 55 via shaft 218 and roller 216 by imparting to said document a step movement of 0.0409 inch at a maximum rate of 200 steps per second (approximately 8 inches per second), or at a slower rate of 100 steps per second (approximately 4 inches per second), whichever is desired. The motor unit 219 is pulsed by signals to rotate roller 216 through an angle of 1.8° for imparting said step movement to the document, until the document is completely read or rejected, and may, for example, take the form of or follow the principles of the escapement and servo-mechanism disclosed in said prior application of Howard W. Silsby III et al., Serial No. 208,432.

*The output roller and stackers*

FIGURES 2, 4, 8, 9 and 14 disclose the output portion of the machine where left and right bed members 315 and 316, respectively, form a bed over which the documents are fed, there being attached to bed members 315 and 316 vertical side rail members 317 and 318 mutually coacting to horizontally guide the documents 55. Inwardly projecting flanges 319, 320 are provided at the upper edges of vertical side members 317 and 318 for vertical guidance of the documents 55. The side rails formed of the members 317, 319 and 318, 320 are each divided at a corresponding location along the length thereof into two sections, the section toward the front end or reading station being disengaged from bed members 316 and 317 and freely pivotable about hinged members 321 and 322 which join the aforesaid portions. Extending longitudinally from the front ends of vertical side rail members 317 and 318 are rods 323 and 324, respectively (FIGURE 9), the ends of which are connected to bearings 325 and 326 which are adapted to follow the surface of curved throat member 207.

Partially attached to the extreme front end of right-hand vertical side rail member 318 there is shown in FIGURE 8 a mechanism for marking the document 55 at the side of the reading station 53, while being read, with pen 327 connected to member 328 which is pivotable about rod 324. Member 328 is fixed to one end of rod 324, the other end of which is connected to a rocker arm cam 330 having a curved working surface, the cam 330 being shown in FIGURE 8 in its normal position. Adjacent the curved surface of rocker arm cam 330 is a roller 331 attached to a pivotable carrier 332 by a pin 333, the carrier 332 being pivoted about its center point by pivot pin 334. A further pin 335, mounted at the lower end of pivotable carrier 332, couples the carrier 332 to the plunger 336 of solenoid 337 having leads 338.

A pair of extension members 340 and 341 are connected to the lower back portion of throat member 207 for guiding the lateral movement of mutual bed members 315 and 316, the bed members further having respective L-shaped guide brackets 342 and 343 depending from points adjacent their forwardly extending edges to define guide channels receiving the extensions 340, 341.

As disclosed in FIGURES 2, 4, 10 and 11, a series of drive rollers 344–350 on respective shafts 351–357 below the bed members 315, 316 project partially through longitudinally spaced slots in the bed members, the shafts 351–357 projecting through the vertical panel 69 and having rollers 358–364 thereon about which are trained a series of interconnected belts driven by motor 366 through drive belt 367 trained about output shaft pulley 368. Directly above the drive rollers 344–347 and 349 are positioned idler rollers 369–373 mounted by spring members 374–378 to rods 379–383 respectively. Three of the aforesaid rods 379–381 are linked by connecting members 382–384 to bar 385 biased by spring 386 towards the front end of the machine and limited in movement by screw stop 387. At its other end, bar 385 is connected to plunger 388 of solenoid 389, having leads 390, mounted on panel 69 by way of bracket 391. Solenoid 389 is energized through leads 390 to attract inwardly the plunger 388 and bar 385 to rotate rods 379–381 and idler rollers 369–371 in a clockwise direction (as viewed from FIGURE 4) to force idler rollers 369–371 into contact with a document 55 and urge the document against drive rollers 344–346 to be driven by the same. Idler rollers 372 and 373 are held in a fixed position at all times to urge document 55 against their associated drive rollers 347 and 349 for driving the document.

The speed of the output drive rollers varies from 12 to 15 inches a second, the rollers nearest the motor 366 being driven at the higher speed as there is a progressive loss in speed transmittal due to the increased loss in the belt drives the further they are extended from the motor 366.

It will be observed that when solenoid 389 is not energized the plunger 388 will be released and attracted outwardly with bar 385 to a limit position determined by stop 387 due to the tensioned spring 386, whereby the rods 379–381 will be caused to rotate in a counterclockwise direction (as viewed in FIGURE 4) to pivot idler rollers 369–371 away from their associated drive rollers.

Generally the document 55 will be read, recognized and then driven by rollers 344–346, after solenoid 389 has been activated by photocell 234 having sensed the trailing edge of a document 55 to pivot idler rollers 369–371 in a direction forcing the document 55 into engagement with rollers 344–346. The document will then be driven by rollers 347–349, between roller 350 and guide member 393, and then by idler roller 394 into the accept pocket 59. However, in many instances the read system will not recognize the intelligence on document 55, in which case the document 55 may be directed into the reject pocket 60. This is accomplished by a solenoid 397 supported on panel 69 by bracket 398 and having leads 99 and a plunger 400. The plunger abuts a lever 401, the upper and lower ends of which are connected to tension spring 402 and shaft 403. The shaft 403 is elongated and extends through panel 69 where it is attached to a sorting gate 404, shown in FIGURE 4 in its normal position. When intelligence is not recognized to an extent where rejection of the document is required, a signal is fed to leads 399 of solenoid 397 to force the plunger 400 outwardly and shift lever 401 against adjustable stop 405, thereby rotating shaft 403 and sorting gate 404 in a clockwise direction (as viewed from FIGURE 4) to direct document 55 via idler roller 406 into the reject pocket 60.

A monitor system is positioned adjacent to sorter gate 404, comprising a light source 407, a separator 408, and a photodiode 409 having leads 410, all of which are mounted on a bracket 411 attached to the side of bed member 315 to be movable therewith. The photodiode 409 and light source 407 are directed to a black portion of bed member 315 so that light will only be reflected when a document 55 is passing. The signal from the diode will be sensed if either (1) a document has been ejected (as disclosed by photodetector 234 at the throat) and does not appear at the sort gate, or (2) a document detected at the sort gate does not pass beyond the monitor photodiode. Because of timing relations, one document will be fed to the scanning station after the document which caused the monitor alarm. However, reading of that document will be suspended, the output drive rollers will be lifted, and the operator must either remove or straighten the document 55 which caused the jam.

Figure 14:
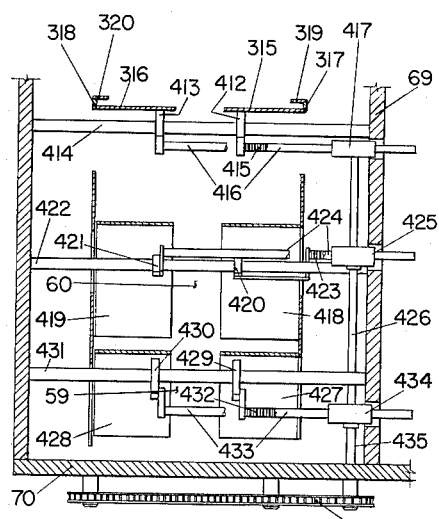
FIGURE 14 is a vertical transverse section view taken along the line 14—14 of FIGURE 4.

FIGURES 11 and 14 disclose the output portion of the document width adjustment system where legs 412 and 413 depend from bed members 315 and 316 and are individually slidable on shaft 414. Leg 412 is fixed to rack 415 and leg 413 is fixed to rack 416, each of the aforesaid racks tangentially contacting one side of a pinion gear within housing block 417. Reject pocket support members 418 and 419 similarly have depending legs 420 and 421, respectively, which are individually slidable on shaft 422 and which have racks 423, 424 respectively fixed thereto and tangentially contacting one side of a pinion gear within housing block 425. The pinion gears within blocks 417 and 425 are connected to a common shaft 326 extending beneath the base chassis 70 to engage the chain and sprocket drive 90. In the same manner the accept pocket support members 427 and 428 have depending legs 429 and 430 which are individually slidable on shaft 431, and which have racks 432, 433 fixed thereto and tangentially contacting one side of a pinion gear within housing block 434. Shaft 435 extends from the last-mentioned pinion gear beneath the base chassis 70 to engage the chain and sprocket drive 90.

It can now be easily appreciated that the width adjustments for accept pocket 59, reject pocket 60, output bed members 315–316, and input tray 56 are all tied into chain and sprocket drive 90 which in turn is controlled by knob 81 (see FIGURE 2) thereby providing a single mechanism for a width adjustment.

FIGURE 15 is presented to show a complete listing of the basic aforementioned electrical signals involved in the instant feed mechanism, wherein each of the reference characters refers to electrical leads connected as follows:

*Input*

112—Brushes 111 for drive clutch 103
113—Brushes 109 for drive clutch 103
114—Magnetic coil of brake housing 105
136—Solenoid 135 to deactivate the height sensor
156′—Solenoid 156 controlling s.a.p. 141
176—Solenoid 174 forcing shuttle legs 161 and 162 down
242—Solenoid 241 of single revolution clutch 249
220—Leads to stepping motor 219
302—Solenoid 301 controlling movement of idler roller 217
338—Solenoid 337 activating marking pen 327
390—Solenoid 389 controlling output idler rollers 369–371
399—Solenoid 397 activating sorting gate 404

*Output*

49—Scanner and feed signals
124—Snap action switch 123 to activate the height sensor
140—Snap action switch 137 denoting tray empty
150—Photocell 149 showing document pickup by s.a.p. 141
235—Photocell 234 sensing a document in the curved throat area 202
271—Cam 261 activates vacuum initiator leads not shown) for shuttle legs 161 and 162
272—Cam 262 activates leads 176 of solenoid 174
273—Cam 263 activates leads 302 of solenoid 301
274—Cam 264 activates leads of magnetic clutch 297
275—Cam 265 activates leads of magnetic brake 297
410—Denotes a document jam at output portion of the mechanism In operation, the width of the documents to be used is established and then knob 81 is turned to adjust the input tray 56, the output bed members 315–316, reject pocket 60 and accept pocket 59 via the chain and sprocket drive 90 for such a width, and the length adjustment is made by operating lever arm 94. The documents 55 are then placed into the input tray 56 while in its lowermost position, and a feed cycle initiator button (not shown) is pressed to set the feed mechanism in an active condition. The height sensor finger 131 is released and dropped, and the drive clutch 103 of the electric clutch/brake assembly 102 will be activated to drive up the input tray 56 until the uppermost documents have pushed up the height sensor 131, activating snap action switch 123 denoting that the uppermost document 55 is at the proper height to be fed. The snap action switch 123 in turn activates the magnetic coil of brake housing 105 to brake the upward movement of the input tray 56 and hold the same, and then activates solenoid 135 to raise the height sensor from contact with documents 55. The snap action switch 123 after a short period also activates the solenoid 156 of shuttle assembly 57 allowing the s.a.p. 141 to drop upon the document 55 and apply a vacuum thereto via tubing 147, so that when the suction action of the s.a.p. 141 is blocked by the attached document 55 the vacuum will act upon the inside surfaces of the s.a.p. 141 to lift the same up with the document 55. As the s.a.p. 141 is lifted to its up position, photocell 149 senses this condition and in turn activates solenoid 241 and thus the single revolution clutch to rotate the cams 261–265. The cams will in turn, (1) apply vacuum to the shuttle legs 161 and 162, (2) force the shuttle legs downwardly to pick up the left and right edges of the document 55 and return the legs to their up position, thereby giving document 55 a curved shape similar to that of curved throat 202, (3) rotate idler roller 217 slightly above the throat area 202, (4) activate the electric clutch 297 to drive the shuttle assembly 57 forward delivering the document 55 to the curved throat 202, (5) activate the electric brake 297 a sufficient time allowing idler roller 217 to contact document 55 and force the same into engagement with stepping roller 216, and then remove the vacuum from s.a.p. 141 and shuttle legs 161, 162 and allow the shuttle assembly 57 to be returned to its initial position by spring 187. Meanwhile picker knives 202, 203 and air pressure spouts 205, 206 aid to literally pick off any excess documents carried by the shuttle assembly. At the curved throat 202 the leading edge of document 55 is sensed by photocell 234 generating a signal to the stepping motor via the scan logic to step the document accordingly so that the intelligence on same may be scanned by the mirror assembly at the reading station. When the trailing edge of the document has been sensed by the photocell 234, signals are emitted to deenergize solenoid 135 allowing the height sensor finger 131 to drop and determine if the document level is at the proper height and then allowing a subsequent feed cycle to occur as heretofore disclosed, energize solenoid 389 to rotate the output idler rollers 369–371 to force the document into engagement with output drive rollers 344–346 to forward the document to its output accept pocket 59, and finally to inform monitor sensor 409 that the document should approach it and pass it within a certain time period. If the document or a portion thereof could not have been read at the reading station, then the sorting gate solenoid 397 is activated to direct the document into the output reject pocket 60. When all of the documents in the input tray 56 have been fed, the tray empty sensor will be activated and the drive clutch 103 of electric clutch/brake assembly 102 is deactivated allowing armature 104 to assume a neutral position, in which case the input tray 56 will drop, its fall being cushioned by an air damping assembly 116, allowing for a subsequent reloading. It is noted that the input tray 56 could be also lowered for reloading by merely pushing a button to deenergize the drive clutch 103 at the electric brake within housing 105.

Obviously many modifications and variations of the present invention are possible in the light of the above teachings. It is therefore to be understood that within the scope of the appended claims, the invention may be practiced otherwise than as specifically described.

What is claimed is:

1. Apparatus for feeding flat documents along a document advancement path comprising means for supporting a plurality of documents in a vertically aligned stack array, pickup head means movable from a first position overlying the stack of documents to a second position spaced along the document advancement path, said pickup head means having a document holding surface facing said stack, said pickup head means including central suction means for attracting the central portion of the uppermost document on the stack to the central portion of said document holding surface and side suction means for attracting portions of said uppermost document located toward the opposite lateral margins of the document from said central portion to side portions of said document holding surface and retaining the same against said surface in substantial conformity to a preselected configuration established by the relative positions of said suction means, at least one of said suction means being movable downwardly from said holding surface to engage and retain a document by suction action and automatically returned upwardly responsive to retention of said document to draw said document into engagement with said holding surface, and means for moving said pickup head along a path generally paralleling said document advancement path while maintaining document retaining suction pressure on said pickup head means to advance a document retained thereby to said second position.

2. Apparatus for withdrawing flat documents from a stack and advancing the same along a document feed path to a selected reading station to be scanned by a scanning device of automatic character sensing equipment and the like comprising means for supporting a plurality of documents in a vertically aligned stack array, pickup head means movable from a position overlying a portion of the uppermost document in said stack to another position further spaced along the document advancement path, said pickup head means having a lower document holding surface facing said stack, first suction means movable downwardly from said holding surface to engage and retain a document by suction action and automatically returning to said holding surface only when said document is retained by suction action in engagement with said first suction means, second suction means movable downwardly from said holding surface to engage and retain another portion of said document by suction action, means returning said second suction means to said holding surface to elevate the uppermost document of the stack into contact with said document holding surface and retaining the same against said surface in substantial conformity to the configuration thereof, and means for moving said pickup head means along a substantially horizontal reciprocative path generally paralleling said document advancement path while maintaining document suction pressure on said pickup means to advance a leading edge of a document retained thereby to said reading station.

3. In apparatus for withdrawing flat documents from a stack and advancing the same along a document feed path to a selected reading station to be scanned by a scanning device of automatic character sensing equipment and the like, the combination recited in claim 2 including means responsive to the position of said first suction means for moving said second suction means downward to engage another portion of said document only when said first suction means has engaged and returned with a document to said holding surface.

4. In apparatus for withdrawing flat documents from a stack and advancing the same along a document feed path to a selected reading station to be scanned by a scanning device of automatic character sensing equipment and the like, the combination recited in claim 2 wherein said pickup head means includes a body whose lower surface defines said holding surface and having a vertical bore therein opening downwardly through said holding surface at the center thereof adapted to be coupled to a suction source, said first suction means comprising a rigid tubular port member having a suction intake opening at the bottom thereof and supported in said bore for vertical movement relative to said body from a raised position aligning said intake opening with said holding surface to a lower position spaced below said holding surface, resilient means normally urging said port member to said lower position, said port member having an aperture for communicating said suction intake opening with the suction source through said bore and being elevated to said raised position by suction action thereon when a document engages and closes said suction intake orifice.

5. In apparatus for withdrawing flat documents from a stack and advancing the same along a document feed path to a selected reading station to be scanned by a scanning device of automatic character sensing equipment and the like, the combination recited in claim 2 wherein said pickup head means includes a body whose lower surface defines said holding surface and having a vertical bore therein opening downwardly through said holding surface at the center thereof adapted to be coupled to a suction source, said first suction means comprising a rigid tubular port member having a suction intake opening at the bottom thereof and supported in said bore for vertical movement relative to said body from a raised position aligning said intake opening with said holding surface to a lower position spaced below said holding surface, resilient means normally urging said port member to said lower position, said port member having an aperture for communicating said suction intake opening with the suction source through said bore and being elevated to said raised position by suction action thereon when a document engages and closes said suction intake orifice, and said second suction means comprising a rigid, inverted U-shaped leg assembly having a substantially horizontal web portion supported for vertical movement in said body and a pair of depending leg portions spaced from said first suction means in laterally flanking relation thereto, said leg portions having suction conduits therein terminating in intake openings at the lowermost surfaces thereof adapted to communicate with a suction source, means connected to said web portion for selectively projecting the leg assembly to a lower position disposing the intake openings of said leg portions below said holding surface, and means for elevating said leg assembly to a raised position disposing said last-mentioned intake openings above the horizontal level of said port member intake opening.

6. Apparatus for withdrawing flat documents from a stack and advancing the same along a document feed path to a selected reading station to be scanned by a scanning device of automatic character sensing equipment and the like comprising means for supporting a plurality of documents in a vertically aligned stacked array, a document supporting member at said reading station having an upwardly facing concave cylindrical surface and a transition throat at an entrance of said surface facing towards said stack, pickup head means movable from a position overlying a portion of the uppermost document in said stack to another position further spaced along the document advancement path, said pickup head means having a lower document holding surface of convex configuration conforming to the curvature of said concave surface facing said stack, first suction means movable downwardly from a central portion of said holding surface having a suction intake opening to engage and retain a document by suction action and automatically return to said holding surface only when said document has been sucked by same, means for detecting the upward movement of said first suction means, second suction means laterally flanking said first suction means responsive to said detection means to move downwardly from said holding surface into substantially planar alignment with said suction intake opening to engage and retain another portion of said document by suction action, means for returning said suction means to said holding surface to elevate the uppermost document of the stack into contact with said document holding surface and retain the same against said surface in substantial conformity to the configuration thereof, and means for moving said pickup head means along a substantially horizontal reciprocative path generally paralleling said document advancement path while maintaining document retaining suction pressure on said pickup head means to advance a leading edge of a document retained thereby to said reading station.

7. Apparatus for withdrawing documents from a stack and advancing the same along a document feed path to a selected reading station to be scanned by a scanning device of automatic character sensing equipment and the like comprising means for supporting a plurality of documents in a vertically stacked array, a document supporting member at said reading station having a throat facing said stack, pickup head means movable from a position overlying a portion of the uppermost document in said stack to a position spaced along said document advance path adjacent to said throat, said pickup head means having a lower document holding surface facing said stack, said pickup head means including document holding means movable relative to said holding surface projectable therefrom for engaging the uppermost document in said stack and retractable to a distinctive position withdrawing the uppermost document to said holding surface, photocell means for detecting the distinctive position of said holding means signifying retention of a document to said holding surface and activating said pickup head means to move the same along a substantially horizontal reciprocative path generally paralleling said document advancement path while maintaining document retaining pressure on said pickup head means to advance a leading edge of the document retained thereby to said reading station.

8. Apparatus for withdrawing documents from a stack and advancing the same along a document feed path to a selected reading station to be scanned by a scanning device of automatic character sensing equipment and the like comprising means for supporting a plurality of documents in a vertically stacked array, a document supporting member at said reading station having a throat facing said stack, means at said throat for engaging a document and stepping the same therethrough while being read, pickup head means movable from a position overlying a portion of the uppermost document in said stack to a position spaced along said document advancement path adjacent to said throat, said pickup head means having a lower document holding surface facing said stack, said pickup head means including document holding means movable relative to said holding surface projectable therefrom for engaging the uppermost document in said stack and retractable to a distinctive position withdrawing the uppermost document to said holding surface, feed cycle means for advancing said pickup head means through a selected cycle of feed operations to transfer a document from said stack to said throat, and photocell means detecting the distinctive position of said holding means signifying retention of a document to said holding surface for initiating operation of feed cycle means.

9. In apparatus for withdrawing documents from a stack and advancing the same along a document feed path to a selected reading station to be scanned by a scanning device of automatic character sensing equipment and the like, the combination recited in claim 8 including means for moving said pickup head means along a substantially horizontal reciprocative path generally paralleling said document advancement path while maintaining document retaining pressure on said pickup head to advance a leading edge of the document retained thereby to said reading station throat, means for activating said document engaging means at the throat to control the advancement of said document through said throat while being read, means for deactivating said document holding means on said pickup head means, and means for returning the pickup head means to overlie said stack for a subsequent feed cycle.

10. Apparatus for withdrawing documents from a stack and advancing the same along a document feed path to a selected reading station to be scanned by a scanning device of automatic character sensing equipment and the like, the combination recited in claim 9 including means for detecting the presence and absence of documents at said reading station, and means for initiating a further feed cycle only when absence of a document at the reading station is detected.

11. Apparatus for withdrawing documents from a stack and advancing the same along a document feed path to a selected reading station to be scanned by a scanning device of automatic character sensing equipment and the like comprising means for supporting a plurality of documents in a vertically stacked array, a document supporting member at said reading station having a throat facing said stack, means at said throat for engaging a document and stepping the same while being read, rectilinearly movable pickup head means, means for moving said pickup head means between a position overlying a portion of the uppermost document in said stack to a position spaced along said document advancement path adjacent to said throat, said pickup head means having a lower document holding surface facing said stack, said pickup head means including document holding means movable relative to said holding surface projectable therefrom for engaging the uppermost document in said stack and retractable to a distinctive position withdrawing the uppermost document to said holding surface, photocell means for detecting the distinctive position of said holding means signifying retention of a document to said holding surface, a single revolution clutch activated by said detecting means, and a series of cams driven by said single revolution clutch for sequentially controlling a series of events forming a feed cycle to deliver the document to the document engagement means at said throat and step the same therethrough for reading purposes.

12. Apparatus for withdrawing documents from a stack and advancing the same along a document feed path to a selected reading station to be scanned by a scanning device of automatic character sensing equipment and the like comprising means for supporting a plurality of documents in a vertically stacked array, a document supporting member at said reading station having a throat facing said stack, means at said throat for engaging a document and stepping the same while being read, rectilinearly movable pickup head means, means for moving said pickup head means between a position overlying a portion of the uppermost document in said stack to a position spaced along said document advancement in path adjacent to said throat, said pickup head means having a lower document holding surface facing said stack, said pickup head means including means for engaging and retaining the uppermost document in said stack to said holding surface, means for detecting the retention of a document to said holding surface, a single revolution clutch activated by said detecting means, and a series of cams driven by said single revolution clutch for sequentially controlling a series of events forming a feed cycle to deliver the document to the document engagement means at said throat and step the same therethrough for reading purposes, electrical contact means responsive to said series of cams to sequentially activate said means for moving said pickup head means to said position adjacent said throat while maintaining document retaining suction pressure on said pickup head to advance a leading edge of the document retained thereby to said reading station, activate said document engaging and stepping means at said throat to enter into driving contact with said document at the reading station, activate said means for retaining said document on said pickup head means to release the document therefrom, and activate said means for moving the pickup head means to return the pickup head means to overlie the said stack for a subsequent feed cycle.

13. In apparatus for withdrawing documents from a stack and advancing the same along a document feed path to a selected reading station to be scanned by a scanning device of automatic character sensing equipment and the like, the combination recited in claim 11 including document sorting output pockets spaced from said reading station in the direction of document travel along said feed path for receiving documents in accordance with selected classification, output roller means between said reading station and said pockets normally disabled from feeding documents therebetween, and means at said reading station for sensing the trailing edge of the document being read for activating said output roller means to forward documents from said reading station into selected ones of said output pocket.

14. Apparatus for withdrawing documents from a stack and advancing the same along a document feed path to a selected reading station to be scanned by a scanning device of automatic character sensing equipment and the like comprising an input tray for supporting a plurality of documents in a vertically stacked array having transversely adjustable document retaining side walls, a document supporting member at said reading station having a throat facing said stack, output document feed path means having transversely adjustable document guide rails, an output hopper having transversely adjustable members for supporting said documents, pickup head means movable from a position overlying a portion of the uppermost document in said stack to a position spaced along said document advancement path adjacent to said throat, said pickup head means having a lower document holding surface facing the stack, said pickup head means including means for engaging and retaining the uppermost document in said stack to said holding surface, means for detecting the retention of a document to said holding surface and activating said pickup head means to move the same along a substantially horizontal reciprocative path generally paralleling said document advancement path while maintaining document retaining suction pressure on said pickup head means to advance and deposit a leading edge of the document retained thereby to said reading station, and single adjustment means for adjusting in unison the said input tray side walls, said guide rails and said adjustable members of the output hopper to accommodate for the width of the documents to be fed.

15. In apparatus for withdrawing documents from a stack and advancing the same along a document feed path to a selected reading station to be scanned by a scanning device of automatic character sensing equipment and the like, the combination recited in claim 7, including means for elevating said document supporting means at a selected time prior to activation of said pickup head means to withdraw a document from the stack, and height sensor means disposed at a selected position related to the level of said throat to be engaged by the uppermost document and regulate said elevating means to dispose the uppermost document of the stack in selected alignment with said throat.

16. In apparatus for withdrawing documents from a stack and advancing the same along a document feed path to a selected reading station to be scanned by a scanning device of automatic character sensing equipment and the like, the combination recited in claim 15 wherein said means for elevating the document supporting means comprises a motor and electric clutch/brake assembly connected to said document supporting means.

17. In apparatus for withdrawing documents from a stack and advancing the same along a document feed path to a selected reading station to be scanned by a scanning device of automatic character sensing equipment and the like, the combination recited in claim 2, wherein said means for supporting the documents includes a document tray, motor means for elevating said tray activated at a selected time prior to each activation of said pickup head means to withdraw a document from the stack, a document supporting member at said reading station having a throat facing said stack, height sensor means positioned at a selected height relative to said throat to terminate operation of said motor means upon contact with the uppermost document in the stack for positioning the uppermost document in selected relation to said throat, means for sensing absence of documents in said tray during activation thereof to deactivate said motor means and effect gravitational lowering of said tray to a selected initial level, and pneumatic check cylinder means operative during lowering of said tray to said selected initial level to cushion the fall thereof.

References Cited by the Examiner

UNITED STATES PATENTS

| | | | |
|---|---|---|---|
| 1,902,486 | 3/33 | Butler. | |
| 2,097,587 | 11/37 | Dearing | 294—64 X |
| 2,570,288 | 10/51 | Todd. | |
| 2,578,329 | 12/51 | Von Hofe. | |
| 2,665,013 | 1/54 | Socke. | |
| 2,912,243 | 11/59 | Gulick | 271—162 |
| 2,932,392 | 4/60 | Burtner. | |
| 2,995,363 | 8/61 | Pittwood | 271—51 |
| 3,016,240 | 1/62 | Twitchell | 271—11 |
| 3,140,867 | 7/64 | Cole | 271—26 |

M. HENSON WOOD, JR., *Primary Examiner.*

ROBERT B. REEVES, *Examiner.*